(12) United States Patent
Kim et al.

(10) Patent No.: US 10,106,408 B2
(45) Date of Patent: Oct. 23, 2018

(54) METHOD FOR CONDUCTING DERACEMIZATION USING TAYLOR FLOW AND A DEVICE THEREFOR

(71) Applicant: University-Industry Cooperation Group of Kyung Hee University, Gyeonggi-do (KR)

(72) Inventors: Woo-Sik Kim, Seoul (KR); Taekyung Yu, Seoul (KR); Zaohui Wu, Gyeonggi-do (KR)

(73) Assignee: University-Industry Cooperation Group of Kyung Hee University, Gyeonggi-do (KR)

( * ) Notice: Subject to any disclaimer, the term of this patent is extended or adjusted under 35 U.S.C. 154(b) by 21 days.

(21) Appl. No.: 15/257,481

(22) Filed: Sep. 6, 2016

(65) Prior Publication Data
US 2017/0081188 A1 Mar. 23, 2017

(30) Foreign Application Priority Data
Sep. 7, 2015 (KR) .................. 10-2015-0126555

(51) Int. Cl.
*B01J 19/24* (2006.01)
*C01B 11/18* (2006.01)

(52) U.S. Cl.
CPC ............ *C01B 11/18* (2013.01); *B01J 19/244* (2013.01); *B01J 2219/00081* (2013.01)

(58) Field of Classification Search
CPC .... C07B 2200/07; C01B 11/18; B01J 19/244; B01J 2219/00081; B01J 19/0066; B01J 19/0093; B01J 19/1806; B01J 19/1843; B01J 2219/00058; B01J 2219/00094; B01J 2219/00797; B01J 2219/00873; B01J 2219/00889; B01J 2219/00961
See application file for complete search history.

(56) References Cited

FOREIGN PATENT DOCUMENTS

KR 2010/0112843 A 10/2010

OTHER PUBLICATIONS

Lee et al. "Phase Transformation of Sulfamerazine Using a Taylor Vortex" 2011, Crystal Growhth and Design, 11, p. 5019-5029.*
Kondepudi et al. "Chiral Symmetry Breaking in Sodium Chlorate Crystallization", Nov. 1990,Science 250 (4983), 975-976.*
El-Hachemi et al "Spontaneous Transition Toward Chirality in the $NaClO_3$ Crystallization in Boiling Solutions" Crystal Growth and Design vol. 9, pp. 4802-4806, 2009.
Kondepudi et al "Chiral Symmetry Breaking in Sodium Chlorate Crystallization" Science vol. 250, pp. 975-976, 1990.
Suwannasang et al "Using Programmed Heating-Cooling Cycles with Racemization in Solution for Complete Symmetry Breaking of a Conglomerate Forming System" Crystal Growth and Design vol. 13, pp. 3498-3504, 2013.

(Continued)

*Primary Examiner* — Amber R Orlando
*Assistant Examiner* — Syed T Iqbal
(74) *Attorney, Agent, or Firm* — Cesari and McKenna, LLP

(57) ABSTRACT

The present invention relates to a method for conducting deracemization using Taylor flow and a device for conducting the same. With respect to the deracemization of a racemate, it may be efficiently conducted with improved rapidity when a racemate-containing fluid is placed under Taylor flow.

3 Claims, 3 Drawing Sheets

(56) References Cited

OTHER PUBLICATIONS

Viedma "Chiral Symmetry Breaking During Crystallization: Complete Chiral Purity Induced by Nonlinear Autocatalysis and Recycling" Physical Review Letters vol. 94, pp. 1-4, 2005.
Viedma "Selective Chiral Symmetry Breaking During Crystallization: Parity Violation or Cryptochiral Environment in Control?" Crystal Growth and Design vol. 7, pp. 553-556, 2007.
Noorduin et al "Scaling Up Attrition-Enhanced Deracemization by Use of an Industrial Bread Mill in a Route to Clopidogrel (Plavix)" Organic Process Research & Development vol. 14, pp. 908-911, 2010.
Viedma et al "Homochirality Beyond Grinding: Deracemizing Chiral Crystals by Temperature Gradient Under Boiling" Chemical Communications vol. 47, pp. 12786-12788, 2011.

\* cited by examiner

[FIG. 1]
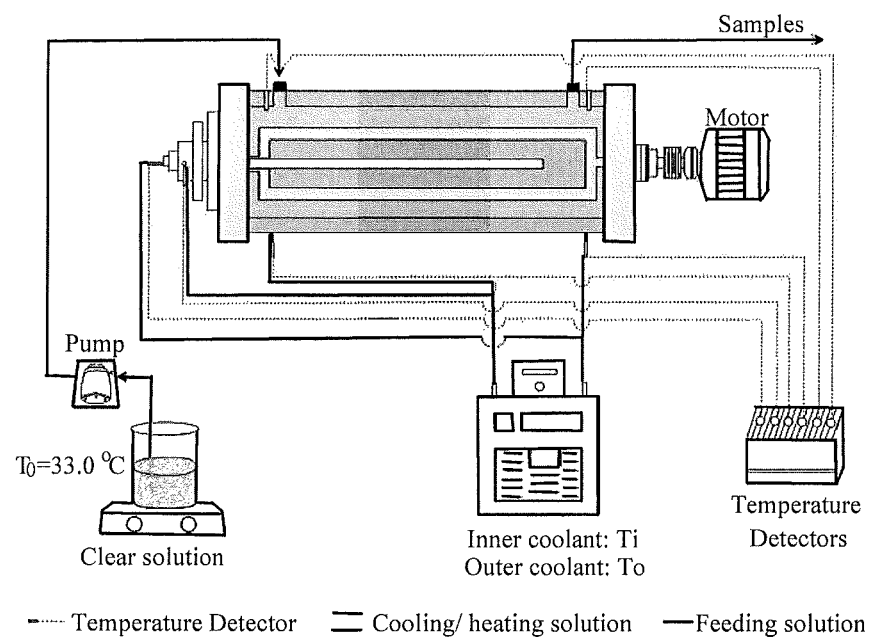

[FIG. 2]
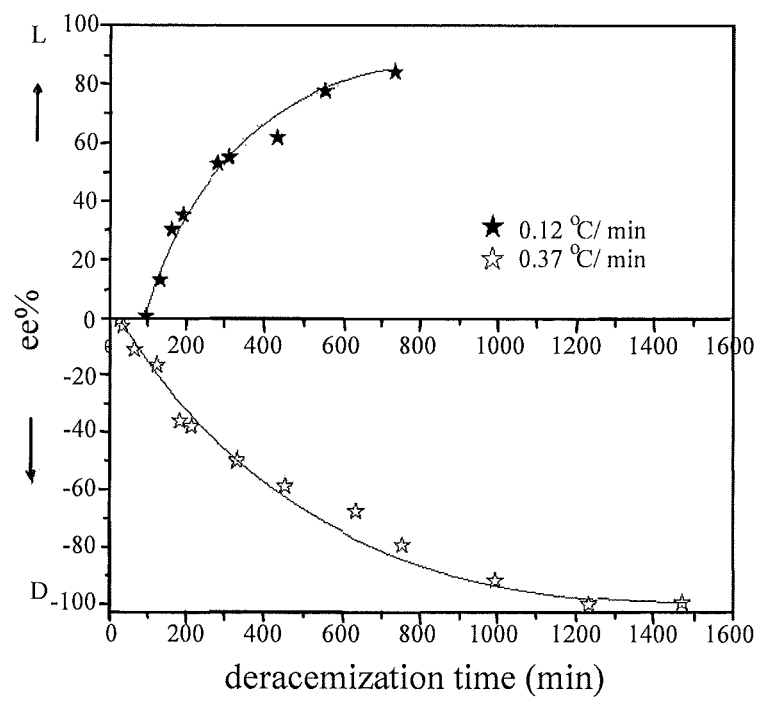
[FIG. 3]
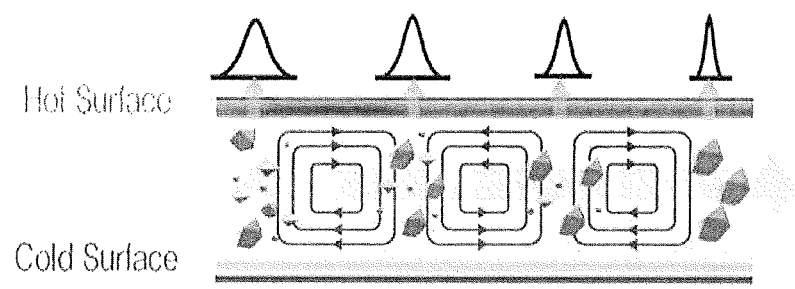

[FIG. 4]
ΔT=3.1 °C
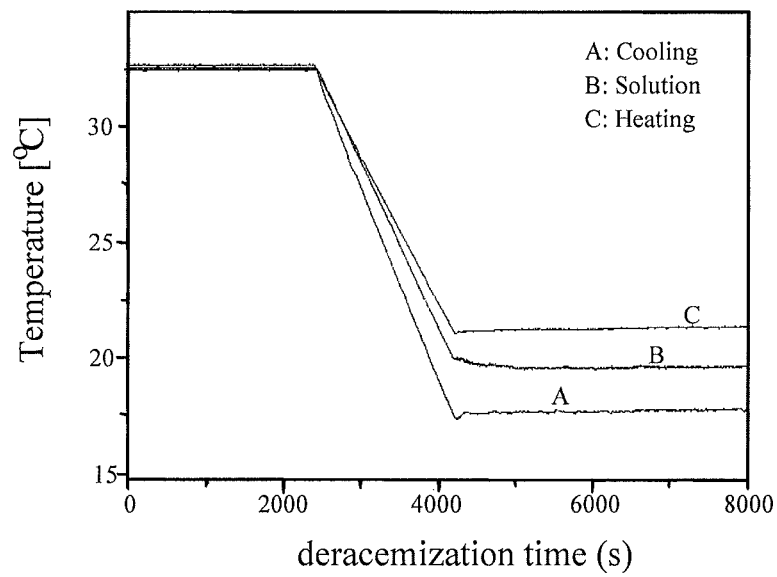
[FIG. 5]
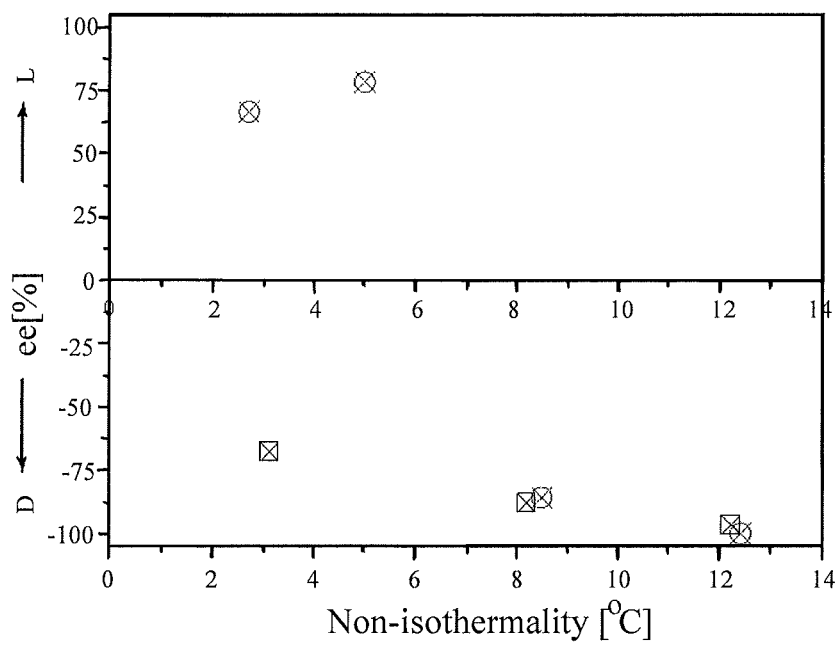

METHOD FOR CONDUCTING DERACEMIZATION USING TAYLOR FLOW AND A DEVICE THEREFOR

TECHNICAL FIELD

The present invention relates to a method for conducting deracemization using Taylor flow and a device for the same.

BACKGROUND ART

Among organic and inorganic materials, there exist materials in which structures of atoms are arranged identically but as mirror images of each other according to a chiral center. These are known as enantiomers. For example, for the amino acids constituting the body, two mirror images can exist with the carbon atom as the chiral center, to which carboxyl and amine groups are attached, and these are respectively called the L- and D-forms.

On the other hand, when the non-chiral compound $NaClO_4$ is stirred, it may crystallize while spontaneously forming a structure of a pure L- or D-form. Additionally, all amino acids existing in organisms are composed of the L-form, and further, when D-amino acids enter the body, it is known that the amino acids may be inactive or cause side effects even if the atomic structure thereof corresponds to that of the L-form. In contrast, all saccharides in the body are known to have the D-form, and therefore, preparing an organic material and/or inorganic material of a single enantiomer is of the utmost importance in producing highly efficient medicines with reduced side effects in the pharmaceutical field. Generally, when synthesizing an organic material and/or inorganic material, both enantiomers are made almost identically, and a mixture with the same amount of each enantiomer is called as a racemic mixture (hereinafter, racemate). The reaction in which a prepared material in a racemic state is converted into one enantiomer is called deracemization.

A conventional deracemization process uses a method of slowly increasing the enantiomeric excess (ee) of one side by increasing and decreasing the temperature of a well-mixed batch reactor (Science 1990, 16, 975; Phys. Rev. Lett. 2005, 94, 065504; Crys. Growth. Deg. 2007, 7, 553; Crys. Growth. Deg. 2009, 9, 4802; Crys. Growth. Deg. 2013, 13, 3498). At this time, when the initial percentage of each enantiomer is formed, one enantiomer is produced slightly more than the other, such that the ratio therebetween is slowly converted from 51:49 to 99:1, and this is called the deracemization phenomenon. However, in this case, there is a disadvantage in that the reaction time requires at least 150 hours.

DISCLOSURE

Technical Problem

An object of the present invention is to provide an efficient deracemization method with improved rapidity, and a device for conducting the same.

Technical Solution

An aspect of the present invention provides a method of deracemization of a racemate, including: a first step for supplying a racemate-containing fluid to a reaction zone of a reactor, which is equipped with an inner cylinder having a surface with a first temperature ($T_1$), an outer cylinder having a surface with a second temperature ($T_2$), and a reaction zone between the inner cylinder and the outer cylinder; and a second step for stirring the racemate-containing fluid under Taylor flow by rotating the inner cylinder while immobilizing the outer cylinder.

A second aspect of the present invention provides a device for deracemization of a racemate including an inner cylinder having a surface with a first temperature ($T_1$), an outer cylinder having a surface with a second temperature ($T_2$), a reaction zone between the inner cylinder and the outer cylinder, and an inlet for providing a racemate-containing fluid within the reaction zone, wherein the racemate is deracemized by stirring the racemate-containing fluid in the reaction zone under Taylor flow by rotating the inner cylinder while immobilizing the outer cylinder.

Hereinafter, the present invention will be described in more detail.

In the present invention, for deracemization of a racemate, it has been found that it is efficiently carried out with improved rapidity when a racemate-containing fluid is placed under Taylor flow. Additionally, in the present invention, it also has been found that the deracemization is further accelerated when the temperature of the surfaces of the inner and outer cylinders producing such Taylor flow is different. The present invention is based on these findings.

When a fluid is flowed between two concentric cylinders, the inner cylinder is rotated. Further, the fluid near the inner cylinder are accelerated to direct toward the outer cylinder by centrifugal force, and thus the fluid becomes unstable and forms a vortex having a pair of rings that are regularly rotated in opposite directions along with the rotation axis of the inner cylinder. This vortex is called "Taylor flow".

In the device generating the Taylor flow, a fluid is flowed between two cylinders having the same axis, and the inner cylinder is rotated about the axis in order to generate the flow. This driving force of the rotation causes the flow of the fluid, and the flow varies according to rotational speed. Laminar flow is generated at low rotational speed, but the speed distribution deviates from the laminar flow with increased rotational speed. This flow exhibits instability, generates a recurrent vortex surrounding the inner cylinder, and further generates various types of flow with increased rotational speed.

In such Taylor flow, a feature of the flow is determined based on the Taylor Number, a dimensionless quantity. The Taylor Number (Ta) is defined in Equation 1 below.

$$Ta \equiv \frac{\text{Centrifugal Force}}{\text{Viscous Force}} \equiv \frac{\Omega^2 R_1 (R_2 - R_1)^3}{v^2} \quad [\text{Equation 1}]$$

In Equation 1 above, $\Omega$ (rad/s) refers to a rotational speed of the inner cylinder, $R_1$ refers to a radius of the inner cylinder, $R_2$ refers to an internal radius of the external cylinder, and v refers to a dynamic viscosity of a fluid ($m^2/s$). The Taylor Number indicates a ratio of centrifugal and viscous forces of a fluid, and is used for determining a form of a flow of the Taylor flow.

When a flow of a fluid between two cylinders having the same axis is changed by the rotation of the inner cylinder, a laminar flow is formed at the low rotational speed of the inner cylinder, and a flow of a radial direction occurs about the axis in a certain rotational speed when the speed of the inner cylinder is increased. That is, the flow changes from the stable laminar flow into a continuous donut-shaped reflux. Such flow is due to the increase in the centrifugal force of the fluid, which was in the laminar flow, according to the growing rotational speed of the inner cylinder, such that it exceeds the viscous force of the fluid, thereby forming the donut-shaped reflux. The Taylor Number at which the donut-shaped reflux is formed due to the unstable fluid in the laminar Couette flow is called as the critical Taylor Number ($Ta_c \approx 1708$), and a periodic donut-shaped flow (Taylor flow) is generated when the Taylor Number becomes greater than the critical Taylor Number. Although the vortex is formed by the instability of the flow, the flow thereof stably covers the inner cylinder. It exhibits an aspect wherein the fluid is well mixed according to the flow generated inside of each periodic vortex, but the fluid is not connected with the vortex.

Flows of various structures are observed when the rotational speed of the inner cylinder is gradually increased. According to the rotation speed of the inner cylinder, flows of various structures, such as a periodic donut-shaped laminar Taylor-vortex flow surrounding the inner cylinder ($1<Ta/Ta_c<3$), a wavy-vortex flow wherein the parts of the formed donut-shaped flow which are dissipated and produced are recurrently flowed ($3<Ta/Ta_c<13.3$), a quasi-periodic wavy-vortex flow ($13.3<Ta/Ta_c<18$), a weak turbulent-vortex flow ($18<Ta/Ta_c<33$), a turbulent Taylor-vortex flow ($33<Ta/Ta_c<160$), and a turbulent flow ($Ta/Ta_c>160$), are consecutively formed in the above order from a laminar Couette flow, in which only a flow of an angular direction from the inner cylinder to the outer cylinder is present ($Ta/Ta_c<1$).

As illustrated above, the deracemization method of a racemate according to the present invention includes a first step for supplying a racemate-containing fluid to a reaction zone of a reactor, which is equipped with the inner cylinder having the surface with a first temperature ($T_1$), the outer cylinder having the surface with a second temperature ($T_2$), and a reaction zone between the inner and outer cylinders; and a second step for stirring the racemate-containing fluid under Taylor flow by rotating the inner cylinder while immobilizing the outer cylinder.

The above first step is a step for supplying the racemate-containing fluid to the reaction zone capable of generating the Taylor flow. The fluid can be supplied as a batch type or a continuous type.

As used herein, the term "racemate" may refer to a mixture in which the same amounts of two mirror-image isomers are mixed. In the present invention, a racemate may refer to one having an enantiomeric excess (ee) value less than or equal to 1.

A racemate capable of being deracemized according to the method in the present invention is not particularly limited, and it may include an inorganic substance or an organic substance. Specifically, examples of the racemate may be $NaClO_4$, clopidogrel, fructose, threonine, carvone, thalidomide, ethambutol, naproxen, penicillin, propranolol, carvedilol, or 1-(4-chlorophenyl)-4,4-dimethyl-2-(1H-1,2,4-triazole-1-yl)pentan-3-one.

In the present invention, a racemate is placed under Taylor flow upon containing the racemate in a fluid. Specifically, the racemate-containing fluid may be an aqueous solution containing a racemate, but is not limited thereto.

In the present invention, when the racemate-containing fluid is supplied as a continuous type, an average retention time of the fluid remaining in a reaction zone may be several minutes to several hours, preferably 1 minute to 10 hours. At this time, the rate of supplying a fluid can be calculated by dividing the volume of the reaction zone by the average retention time. For example, the rate of supplying a fluid may be 300 mL/minute to 0.5 mL/minute when the volume of the reaction zone is 300 mL.

In the present invention, $T_1$ may be equal to $T_2$ ($T_1=T_2$) or $T_1$ may not be equal to $T_2$ ($T_1 \neq T_2$). That is, the racemate-containing fluid may be placed under isothermal Taylor flow or non-isothermal Taylor flow. Preferably, it is advantageous to apply the non-isothermal Taylor flow for rapid deracemization.

In the present invention, when $T_1$ is not equal to $T_2$ ($T_1 \neq T_2$), the temperature difference may be 1° C. to 50° C., preferably 1° C. to 10° C. or 2° C. to 5° C., or more preferably 3° C. If the temperature difference between $T_1$ and $T_2$ is below 1° C., an advantageous effect of applying the non-isothermal Taylor flow may not sufficiently be exhibited. Additionally, if such difference is more than 10° C., a process may be inefficiently conducted due to the energy consumption.

The second step is a step of inducing deracemization by placing a racemate-containing fluid under Taylor flow.

In the present invention, in order to apply the Taylor flow, the rotational speed of the inner cylinder may be adjusted to meet the condition of $1<Ta/Ta_c<160$, wherein Ta is a Taylor Number under an applied condition in the second step and $Ta_c$ is a critical Taylor Number.

As described above, at least 50% of the enantiomeric excess (ee) value may be obtained within 24 hours through the deracemization using the Taylor flow according to the present invention.

In an exemplary embodiment of the present invention, it was observed that at least 80% of the enantiomeric excess (ee) value is obtained within 24 hours when the deracemization reaction is carried out under the isothermal Taylor flow using an aqueous $NaClO_4$ solution (Example 1).

Additionally, at least 50% of the enantiomeric excess (ee) value can be obtained within 12 hours if the non-isothermal Taylor flow, i.e, $T_1 \neq T_2$, is used.

In an exemplary embodiment of the present invention, it was observed that at least 99% of the enantiomeric excess (ee) value is obtained within 12 hours when the deracemization reaction is carried out under the non-isothermal Taylor flow using an aqueous $NaClO_4$ solution (Example 2).

Additionally, the deracemization device according to the present invention, as described above, is equipped with the inner cylinder having the surface of a first temperature $T_1$, the outer cylinder having the surface of a second temperature $T_2$, a reaction zone between the inner cylinder and outer cylinder, and an inlet for providing the racemate-containing fluid within the reaction zone.

The deracemization device according to the present invention can deracemize a racemate by stirring the racemate-containing fluid in the reaction zone under the Taylor flow by rotating the inner cylinder while immobilizing the outer cylinder. The deracemization device may be a batch type or a continuous type.

The deracemization device according to the present invention may use a non-isothermal flow or an isothermal flow. That is, the deracemization device according to the present invention may be $T_1=T_2$ or $T_1 \neq T_2$.

In the deracemization device according to the present invention, the temperature in the inner and outer cylinders may be adjusted by a heat exchanger for heat generation or that for heat absorption, and thereby isothermal or non-isothermal Taylor flow may be generated within a reaction zone.

In the present invention, the inner cylinder itself may be a heat exchanger for heat absorption or heat generation, or a heat exchanger for the same may be separately equipped within the inner cylinder. Additionally, the outer cylinder itself may be a heat exchanger for heat absorption or heat generation, or a heat exchanger for heat generation or heat absorption may be separately equipped in the outside of the outer cylinder.

In the deracemization device, a heat exchanger for the heat generation may be located in the inner cylinder, when $T_1 > T_2$.

In the deracemization device, a heat exchanger for the heat absorption may be located in the inner cylinder, when $T_1 < T_2$.

The first temperature ($T_1$) and second temperature ($T_2$) can be adequately adjusted depending on a type of starting materials to be used or that of products prepared therefrom.

Final produced materials of the deracemization may be discharged to the outside through an outlet port arranged in the immobilized outer cylinder.

Advantageous Effects

With respect to deracemization of a racemate, the present invention efficiently conducts the deracemization with improved rapidity when a racemate-containing fluid is placed under Taylor flow. In particular, it is advantageous in that the deracemization can be conducted with further improved rapidity when a difference between the surface temperatures of the inner and outer cylinders producing such Taylor flow is created.

BRIEF DESCRIPTION OF THE DRAWINGS

FIG. 1 schematically shows a reactor for the deracemization reaction according to an exemplary embodiment of the present invention.

FIG. 2 shows a variation of an enantiomeric excess (ee) according to time when the deracemization reaction using the isothermal Taylor flow is carried out according to the present invention.

FIG. 3 is an outline of the deracemization reaction which uses the non-isothermal Taylor flow according to the present invention.

FIG. 4 shows a variation in temperatures of the cold surface (outer cylinder) and hot surface (inner cylinder), and an average temperature of a solution within a reaction zone, according to time, when using the non-isothermal Couette-Taylor reactor according to an exemplary embodiment of the present invention.

FIG. 5 shows a result of the deracemization reaction using the non-isothermal Couette-Taylor reactor.

DETAILED DESCRIPTION OF THE INVENTION

Hereinbelow, the present invention will be described in detail with accompanying exemplary embodiments. However, the exemplary embodiments disclosed herein are only for illustrative purposes and should not be construed as limiting the scope of the present invention.

Example 1: Deracemization Reaction Using Isothermal Taylor Flow

As shown in FIG. 1, a reactor for the deracemization reaction according to an exemplary embodiment was prepared.

The deracemization reaction was carried out using the prepared reactor for the deracemization reaction, and the result thereof was investigated. The process for carrying out the deracemization reaction will be described in more detail.

First, $NaClO_4$ (100 g) was dissolved in water (100 mL) to prepare a $NaClO_4$ solution. Additionally, the $NaClO_4$ solution having the initial temperature of 33° C. was placed in the reactor for the deracemization reaction, and was then cooled to finally reach 20° C. at each different cooling rate, as shown in Table 1 below. Induction time, the time taken to obtain the first crystal from the time-point of initiating the cooling, was measured, and an enantiomeric excess (ee) value was then measured at the time-point above, thereby indicating such value as the initial enantiomeric excess (ee) value.

Thereafter, the deracemization was induced by rotating the inner cylinder in the reactor at a different rotational speed, calculated respectively according to the range of $Ta/Ta_c$, as shown in Table 1 below.

TABLE 1

| range | Flow regime | Presented rotation speed [rpm] (applied $Ta/Ta_c$ value) |
|---|---|---|
| $Ta/Ta_c < 1$ | Laminar Couette flow | 10 (0.9) |
| $1 < Ta/Ta_c < 3$ | Laminar Taylor vortex flow | 30 (2.7) |
| $3 < Ta/Ta_c < 13.3$ | Wavy vortex flow | 100 (8.99) |
| $13.3 < Ta/Ta_c < 18$ | Quasy-periodic wavy wortec flow | 180 (16.20) |
| $18 < Ta/Ta_c < 33$ | Weakly turbulent vortex flow | 300 (27.00) |
| $33 < Ta/Ta_c < 160$ | Turbulent Taylor vortex flow | 500 (44.99) |

The enantiomeric excess (ee) values were measured in each bath time by differing the bath time in the reactor and the result thereof is shown in Table 2 below.

TABLE 2

| | Solution Concent [g/100 ml] | Initial Temp. [° C.] | Setting Temp. [° C.] | Cooling rate [° C./min] | Rotation speed [rpm] | Induction time [min] | Ini. ee [%] | Bath time [h] | Final ee [%] |
|---|---|---|---|---|---|---|---|---|---|
| 1 | 100 | 33 | 20 | 0.12 | 500 | 90 | 0.81 (L) | 10 | 81.25 (L) |
| | | | | | | 91 | 0.769 (L) | 10 | 84.28 (L) |
| | | | | | | 87 | 0.629 (D) | 10 | 81.82 (D) |
| | | | | | | 85 | 0.412 (D) | 1 | 29.79 (D) |
| | | | | | | 89 | 0.6211 (D) | 1 | 31.43 (D) |
| 2 | 100 | 33 | 20 | 0.37 | 500 | 24 | 0.569 (D) | 10 | 63.13 (D) |
| | | | | | | 26 | 0.56 (L) | 10 | 67.36 (L) |
| | | | | | | 29 | 0.402 (L) | 10 | 66.22 (L) |
| | | | | | | 26 | 0.226 (D) | 1 | 10.07 (D) |
| | | | | | | 24 | 0.157 (L) | 1 | 9.79 (L) |
| | | | | | | 25 | 0.213 (L) | 1 | 8.16 (L) |
| | | | | | | 25 | 0.207 (D) | 1 | 6.422 (D) |
| | | | | | | 26 | 0.272 (L) | 1 | 6.782 (L) |
| | | | | | | 27 | | 24 | 100 (D) |

TABLE 2-continued

| | Solution Concent [g/100 ml] | Initial Temp. [° C.] | Setting Temp. [° C.] | Cooling rate [° C./min] | Rotation speed [rpm] | Induction time [min] | Ini. ee [%] | Bath time [h] | Final ee [%] |
|---|---|---|---|---|---|---|---|---|---|
| 3 | 100 | 33 | 20 | 0.57 | 500 | 16 | 0.12 (D) | 10 | 50.82 (D) |
| | | | | | | 14 | 0.22 (L) | 10 | 51.50 (L) |
| | | | | | | 14 | 0.36 (L) | 10 | 54.51 (L) |
| | | | | | | 15 | 0.42 (L) | 1 | 8.35 (L) |
| | | | | | | 13 | 0.212 (D) | 1 | 7.47 (D) |
| 4 | 100 | 33 | 20 | 0.68 | 500 | 12 | 0.152 (D) | 10 | 40.12 (D) |
| | | | | | | 12 | 0.493 (D) | 1 | 5.73 (D) |
| | | | | | | 10 | 0.22 (L) | 1 | 8.15 (L) |
| | | | | | | 11 | 0.513 (L) | 1 | 6.631 (L) |
| 5 | 100 | 33 | 20 | 0.37 | 300 | 27 | 0.22 (L) | 10 | 49.64 (L) |
| | | | | | | 29 | 0.319 (L) | 1 | 5.938 (L) |
| | | | | | | 28 | 0.426 (D) | 1 | 3.136 (D) |
| | | | | | | 28 | 0.24 (L) | 1 | 2.296 (L) |
| | | | | | | 28 | 0.182 (D) | 1 | 7.134 (D) |
| | | | | | | 27 | 0.388 (D) | 1 | 3.006 (D) |
| | | | | | | 27 | 0.339 (L) | 1 | 2.778 (L) |
| | | | | | | 27 | 0.215 (L) | 1 | 4.425 (L) |
| 6 | 100 | 33 | 20 | 0.37 | 180 | 29 | 0.389 (D) | 1 | 3.018 (D) |
| | | | | | | 28 | 0.306 (L) | 1 | 4.478 (L) |
| | | | | | | 29 | 0.437 (L) | 1 | 3.208 (L) |
| | | | | | | 30 | 0.322 (L) | 1 | 4.784 (L) |
| | | | | | | 28 | 0.465 (L) | 1 | 5.603 (L) |
| | | | | | | 29 | 0.358 (D) | 1 | 6.273 (D) |
| | | | | | | 29 | 0.524 (D) | 10 | 35.87 (D) |
| 7 | 100 | 33 | 20 | 0.37 | 100 | 29 | 0.495 (D) | 1 | 1.288 (D) |
| | | | | | | 29 | 0.4651 (D) | 1 | 2.351 (D) |
| | | | | | | 30 | 0.352 (L) | 1 | 2.301 (L) |
| | | | | | | 30 | 0.372 (D) | 1 | 5.975 (D) |
| | | | | | | 31 | 0.197 (L) | 1 | 6.369 (L) |
| | | | | | | 31 | 0.408 (L) | 1 | 3.338 (L) |
| | | | | | | 30 | 0.126 (D) | 1 | 4.109 (D) |
| | | | | | | 31 | 0.433 (L) | 1 | 6.796 (L) |
| | | | | | | 31 | 0.369 (L) | 10 | 24.42 (L) |
| 8 | 100 | 33 | 20 | 0.37 | 30 | 31 | 0.264 (L) | 1 | 2.627 (L) |
| | | | | | | 32 | 0.324 (D) | 1 | 2.866 (D) |
| | | | | | | 30 | 0.258 (D) | 1 | 1.493 (D) |
| | | | | | | 32 | 0.469 (D) | 1 | 2.644 (D) |
| | | | | | 20 | 32 | 0.210 (D) | 1 | 1.639 (D) |
| | | | | | | 31 | 0.127 (L) | 1 | 1.259 (L) |
| | | | | | | 33 | 0.154 (L) | 1 | 3.571 (L) |
| | | | | | | 31 | 0.302 (D) | 1 | 2.692 (D) |
| 9 | 100 | 33 | 20 | 0.37 | 800 | 23 | 0.79 (L) | 10 | 79.73 (L) |
| 10 | 100 | 33 | 20 | 0.37 | 1100 | 16 | 0.86 (L) | 10 | 91.49 (L) |

The result of Table 2 shows that the ee value was less than 1% during the initial stage, but an ee value of at least 20% was obtained within 10 hours when the deracemization reaction using the isothermal Taylor flow according to the present invention was conducted.

Additionally, an ee value of at least 99% was obtained within 20 hours when the deracemization reaction using the isothermal Taylor flow according to the present invention was conducted. Specifically, it was confirmed that an ee value of at least 99% was shown within 20 hours from the result of the deracemization reaction on the sample (☆), in which the initial ee value was 0.569% (D) when the cooling rate (0.37° C./min) was applied, and the sample (★), in which the initial ee value was 0.81% (L) when the cooling rate (0.12° C./min) was applied, among samples in Table 2 above (FIG. 2).

Example 2: Deracemization Reaction Using Non-Isothermal Taylor Flow

The deracemization reaction was conducted using the reactor and conditions corresponding to Example 1, except the temperature swing was possible during the deracemization in the inside of the Taylor reactor by differing the temperature of the inner Couette-Taylor reactor from that of the outer Couette-Taylor reactor as shown in FIG. 3.

Specifically, the surface of the outer cylinder was the cold surface while the surface of the inner cylinder was the hot surface. FIG. 4 shows a variation in temperatures of the cold surface (outer cylinder) and hot surface (inner cylinder), and an average temperature of a solution within a reaction zone, according to time, when using the non-isothermal Couette-Taylor reactor according to an exemplary embodiment of the present invention.

As a result, it was confirmed that an ee value of at least 99% was obtained when using the non-isothermal Couette-Taylor reactor, in which the temperature difference of the inside and outside is 3° C., thereby carrying out the efficient deracemization process compared to the isothermal Couette-Taylor reactor (FIG. 5).

The invention claimed is:
1. A method of deracemizing a racemate, comprising:
    a first step of supplying a racemate-containing fluid to a reaction zone of a reactor, which includes an inner cylinder having a surface with a first temperature ($T_1$), an outer cylinder having a surface with a second temperature ($T_2$), and a reaction zone between the inner cylinder and the outer cylinder; and
    a second step of stirring the racemate-containing fluid under Taylor flow by rotating the inner cylinder while immobilizing the outer cylinder;

wherein
the racemate is $NaClO_4$, clopidogrel, fructose, threonine, carvone, thalidomide, ethambutol, naproxen, penicillin, propranolol, carvedilol, or 1-(4-chlorophenyl)-4,4-dimethyl-2-(1H-1,2,4-triazole-1-yl)pentan-3-one;

the inner cylinder is rotated at a speed adjusted to meet the condition $33<Ta/Ta_c<160$, Ta being a Taylor number under an applied condition and $Ta_c$ being a critical Taylor number; and the difference between $T_1$ and $T_2$ is 1° C. to 10° C., whereby an enantiomeric excess value of at least 50% is obtained within 12 hours.

2. The method of claim 1, wherein the racemate-containing fluid is supplied as a batch type or continuous type.

3. The method of claim 1, wherein the racemate-containing fluid is an aqueous solution.

* * * * *